US012612126B2

(12) United States Patent
Diehl

(10) Patent No.: US 12,612,126 B2
(45) Date of Patent: Apr. 28, 2026

(54) SEAT DEVICE FOR A TILTING VEHICLE

(71) Applicant: Bayerische Motoren Werke Aktiengesellschaft, Munich (DE)

(72) Inventor: Helmut Diehl, Kochel (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 169 days.

(21) Appl. No.: 18/721,250

(22) PCT Filed: Feb. 8, 2023

(86) PCT No.: PCT/EP2023/053044
§ 371 (c)(1),
(2) Date: Jun. 18, 2024

(87) PCT Pub. No.: WO2023/169761
PCT Pub. Date: Sep. 14, 2023

(65) Prior Publication Data
US 2025/0065973 A1 Feb. 27, 2025

(30) Foreign Application Priority Data

Mar. 7, 2022 (DE) ..................... 10 2022 105 235.4

(51) Int. Cl.
*B62J 1/10* (2006.01)
*B62J 1/12* (2006.01)
(52) U.S. Cl.
CPC .. *B62J 1/10* (2013.01); *B62J 1/12* (2013.01)
(58) Field of Classification Search
CPC ...... B62J 1/02; B62J 1/10; A47C 7/28; A47C 7/345
See application file for complete search history.

(56) References Cited

U.S. PATENT DOCUMENTS 498,136 A * 5/1893 McDonald ................. B62J 1/10
297/215
500,156 A * 6/1893 Sager ........................ B62J 1/10
297/215
(Continued)

FOREIGN PATENT DOCUMENTS

CN 108674536 A 10/2018
CN 113635820 A 11/2021
(Continued)

OTHER PUBLICATIONS

International Search Report (PCT/ISA/210) issued in PCT Application No. PCT/EP2023/053044 dated May 23, 2023 with English translation (5 pages).
(Continued)

*Primary Examiner* — Joshua J Michener
*Assistant Examiner* — Michael B. Kreiner
(74) *Attorney, Agent, or Firm* — Crowell & Moring LLP

(57) ABSTRACT

A seat device for a tilting vehicle includes: at least one seat body which has a seat surface on which a user of the tilting vehicle can be disposed and to which a force acting in a direction of action can be applied, the direction of action running transversely to the seat surface; at least one support unit which has at least one resiliently flexible and/or deformable first support portion on which the seat body is disposed, at least one rigid, non-flexible second support portion, and at least one cavity extending parallel or obliquely to the seat surface and disposed between the first support portion and the second support portion, by which cavity the first support portion and the second support portion are spaced apart from each other without touching and by which an elastic deformation of the first support portion toward the cavity is enabled. At least one adjustment unit has at least one adjustment body which is disposed movably in the cavity and by which the first support portion is supported against (Continued)

the second support portion and can be transferred from a first support position to a second support position.

12 Claims, 1 Drawing Sheet

(56) References Cited

U.S. PATENT DOCUMENTS

| 500,158 | A | * | 6/1893 | Sager | B62J 1/10 |
| | | | | | 297/215 |
| 511,363 | A | * | 12/1893 | Sager | B62J 1/10 |
| | | | | | 297/215 |
| 4,673,212 | A | * | 6/1987 | Mayer | B62J 1/00 |
| | | | | | 297/195.12 |
| 5,048,891 | A | * | 9/1991 | Yach | B62J 1/065 |
| | | | | | 297/215.14 |
| 6,257,662 | B1 | * | 7/2001 | Yates | B62J 1/10 |
| | | | | | 297/202 |

| 6,371,554 | B1 | | 4/2002 | Ko | |
| 6,827,397 | B1 | * | 12/2004 | Driver | B62J 1/10 |
| | | | | | 297/215.14 |
| 9,573,642 | B2 | * | 2/2017 | Liao | B62J 1/02 |

FOREIGN PATENT DOCUMENTS

| CN | 114056210 | A | | 2/2022 | |
| DE | 42 19 940 | C1 | | 7/1993 | |
| GB | 216047 | A | * | 5/1924 | B62J 1/08 |
| KR | 101919235 | B1 | * | 11/2018 | B62J 1/10 |

OTHER PUBLICATIONS

German-language Written Opinion (PCT/ISA/237) issued in PCT Application No. PCT/EP2023/053044 dated May 23, 2023 with English translation (8 pages).
German-language Search Report issued in German Application No. 10 2022 105 235.4 dated Nov. 11, 2022 with partial English translation (10 pages).

* cited by examiner

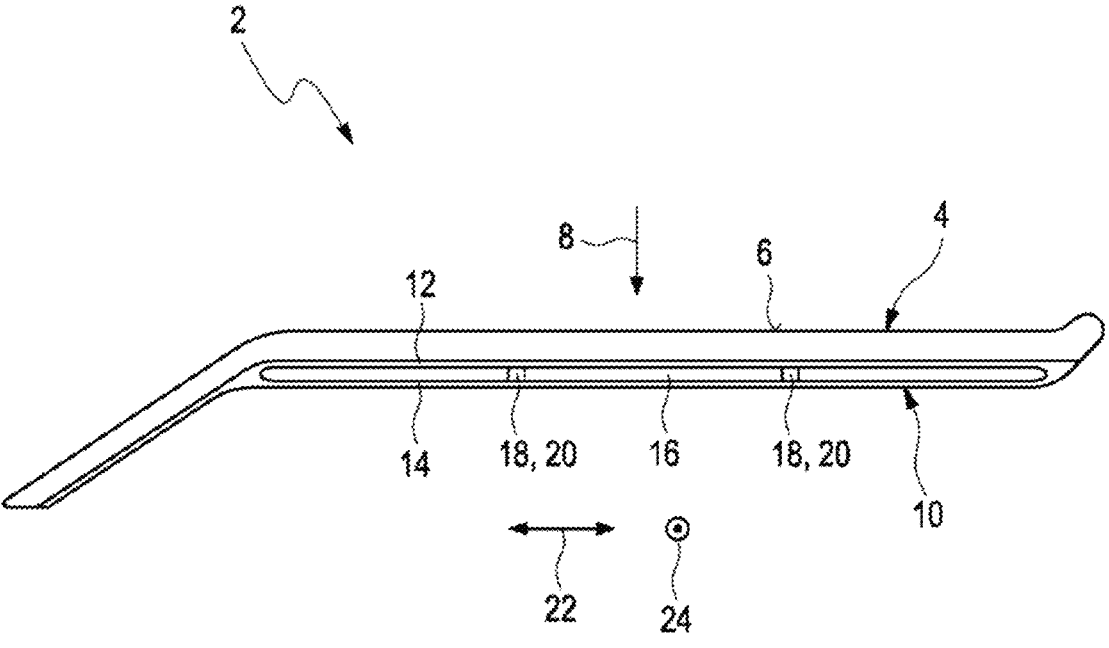

SEAT DEVICE FOR A TILTING VEHICLE

BACKGROUND AND SUMMARY

The invention relates to a seat apparatus for a tilting vehicle.

Seat apparatuses for tilting vehicles are known in different embodiments from the prior art. They can comprise adjustment devices, by which an inclination of the seat face of the seat apparatus can be adjusted. In this instance, the seat face of the seat apparatus is changed with respect to the inclination thereof relative to the travel direction.

Furthermore, it is known that a seat apparatus can be adapted to a user of the motor vehicle in a workshop, for example, by exchanging a bench type seat of the seat apparatus, with respect to the seat hardness.

In the known seat apparatuses, the inclination is changed over the entire seat face or the seat apparatus must be disassembled in order to be changed only in regions in a workshop. The same applies to adjusting the seat hardness.

An object of an exemplary embodiment of the invention is to provide a seat apparatus for a motor vehicle, wherein a partial adjustment of an inclination and/or a seat hardness of the seat apparatus is simplified.

This object is achieved by a seat apparatus for a tilting vehicle having at least one seat member which comprises a seat face on which a user of the tilting vehicle can be arranged, and which can be acted on with a force which acts in an active direction, wherein the active direction extends transversely relative to the seat face, having at least one carrier unit which comprises at least one resiliently bendable and/or deformable first carrier portion on which the seat member is arranged, which comprises at least one rigid and flexurally rigid second carrier portion and which comprises at least one hollow space which is arranged between the first carrier portion and second carrier portion and which extends parallel with or obliquely relative to the seat face, and by which the first carrier portion and the second carrier portion are spaced apart from each other without contact and by which a resilient deformation of the first carrier portion in the direction of the hollow space is released, and having at least one adjustment unit which comprises at least one adjustment member which is movably arranged in the hollow space and by which the first carrier portion is supported on the second carrier portion and which can be changed from a first support position, in which the first carrier portion comprises a first spring rate, into a second support position, in which the first carrier portion comprises a second spring rate which differs with respect to the first spring rate.

In that the carrier unit of the seat apparatus comprises a first carrier portion which is resiliently bendable, the first carrier portion acts with a resilient force counter to the force acting in an active direction. In that the adjustment unit comprises at least one adjustment member which is movable in the hollow space and with which in a first support position a first spring rate of the first carrier portion and in the second support position a second spring rate of the first carrier portion are adjustable, a changed seat hardness of the seat member, which comprises the seat face, is adjustable via the changed spring rate.

Depending on the position of the adjustment member, in such cases a surface geometry of the seat member, particularly the seat face of the seat member, is also adjustable, in particular in that a user of the tilting vehicle sits more softly, that is to say, sinks down more deeply, in regions of the seat face with a reduced spring rate of the first carrier portion than in regions with an increased spring rate. The regions of increased spring rate can be arranged, for example, at the height of the adjustment member or in the immediate vicinity of the adjustment member.

The rigid and flexurally rigid second carrier portion of the carrier unit may comprise a rigid and flexurally rigid material or be secured to a rigid and flexurally rigid frame of the tilting vehicle in abutment in a planar manner. In such cases, the second carrier portion may also comprise a flexible material, but is secured against deformation by the frame of the tilting vehicle.

The adjustment member can be arranged in the hollow space in such a manner that it always abuts the second carrier portion with contact and is spaced apart from the first carrier portion when no user of the tilting vehicle is sitting on the seat apparatus. Furthermore, the adjustment member can always be arranged in abutment with contact against both the first carrier portion and the second carrier portion.

The active direction of the force can extend parallel with or obliquely relative to a vertical axis of the tilting vehicle.

The term "tilting vehicle" is intended to be understood to be bicycles, motorcycles or motorcycle-like motor vehicles, such as motor scooters, in particular two-wheel, three-wheel or four-wheel motor scooters, scooters, tiltable trikes, quad bikes or the like.

In one embodiment of the seat apparatus, there is provision for the at least one adjustment member to be able to be moved manually or automatically from the first support position into the second support position, and vice versa.

If the at least one adjustment member can be moved manually from the first support position into the second support position, and vice versa, the seat apparatus can be produced and operated in a cost-effective manner. If the at least one adjustment member can be moved automatically from the first support position into the second support position, and vice versa, the comfort of the seat apparatus is increased and operation is made easier.

In a further development of the last embodiment mentioned, different support positions which are adapted to an individual user of the tilting vehicle can be stored in a control unit of the seat apparatus. In such cases, the seat apparatus is automatically adjusted to the selected user when the tilting vehicle is operated.

Furthermore, the seat apparatus can be automatically controlled by the control unit in order to adjust an inclination, which is adapted to the travel situation, of the seat face or hardness of the seat face, for example, in order to support an acceleration operation or a braking operation or in order to switch from on-road operation to off-road operation.

Furthermore, in embodiments of the seat apparatus there is provision for at least one of the at least one adjustment members to be able to be moved by a translational movement in a movement direction, which extends transversely or obliquely relative to the active direction, from the first support position into the second support position, and/or for at least one of the at least one adjustment members to be able to be moved by rotation about a rotation axis which extends centrally or eccentrically through the adjustment member from the first support position into the second support position.

If at least one of the at least one adjustment members can be moved by a translational movement in a movement direction, which extends transversely or obliquely relative to the active direction, from the first support position into the second support position, the at least one adjustment member is variable in relative terms with respect to the position thereof in the hollow space.

If at least one of the at least one adjustment members can be moved by rotation about a rotation axis which extends centrally or eccentrically through the adjustment member from the first support position into the second support position, the position of the adjustment member is constant with respect to a longitudinal axis of the tilting vehicle. The adjustment member can, if it is rotatable about a centrally extending rotation axis, comprise an elliptical or polygonal cross section. If the adjustment member extends about a rotation axis which extends eccentrically through the adjustment member, the adjustment member can also comprise a circular cross section in addition to an elliptical or polygonal cross section.

If the adjustment member is movable by a translational movement in a movement direction which extends transversely or obliquely relative to the active direction, the movement direction can extend parallel with or obliquely to a longitudinal axis of the tilting vehicle.

If the adjustment member can be moved manually from the first support position into the second support position, and vice versa, it is found to be advantageous if the hollow space comprises a continuous recess which is accessible from the outer side from an access direction which extends transversely relative to the active direction and transversely relative to the movement direction of the adjustment member.

In such cases, the adjustment member is accessible in a simple manner. The hollow space extends in such cases parallel with or obliquely to the longitudinal direction of the tilting vehicle and is accessible from the outer side laterally, that is to say, parallel with or obliquely to the transverse axis of the tilting vehicle.

Furthermore, the configuration of the hollow space as a continuous recess which is accessible from the outer side allows simple replacement of the at least one adjustment member.

In order to be able to adjust the inclination of the seat face or the degree of hardness of the seat apparatus, it is found to be advantageous if the at least one adjustment member is configured to be resiliently deformable or rigid at least in the active direction of the force.

If the adjustment member is configured to be rigid, it is simply used as a support for the first carrier portion, whereby the spring rate of the first carrier portion is determined exclusively by the first carrier portion. If the at least one adjustment member itself is resiliently deformable, the interaction of the adjustment member and the first carrier portion determines the spring rate in the first support position and in the second support position.

Furthermore, embodiments of the seat apparatus are conceivable in which the at least one adjustment member abuts the first carrier portion and/or the second carrier portion in a linear or planar manner.

The adjustability of an inclination of the seat face or the adjustability of a degree of hardness of the seat member can be further adjusted if the seat apparatus comprises at least two adjustment members, of which at least two adjustment members together, in particular in a state coupled together, can be moved from the first support position into the second support position and/or by at least two adjustment members, of which at least two adjustment members can be moved individually and independently of each other from the first support position into the second support position.

If the at least two adjustment members can be moved together from the first support position into the second support position, an adjustment of the seat apparatus is made easier. If the at least two adjustment members can be moved independently of each other from the first support position into the second support position, an adjustability of the seat apparatus is expanded. In such cases, regions with changed seat hardness can be adapted in a more individual manner.

The first carrier portion can comprise a first carrier element which is in the form of a separable or separate component with respect to the second carrier portion which may be in the form of a second carrier element. The seat apparatus can be formed with a reduced number of components if the first carrier portion and the second carrier portion form a common integral component, particularly if the carrier unit comprises a two-component injection-molded part.

If the carrier unit comprises a two-component injection-molded part, the first carrier portion can be formed from a first plastics material which is accordingly resiliently bendable and the second carrier portion can be formed by a non-resilient rigid plastics material.

Furthermore, embodiments of the seat apparatus are conceivable in which the seat member comprises an upholstery member or a plastics component.

If the seat member comprises an upholstery member, the upholstery member already comprises as a result of the material properties thereof per se a specific seat hardness and upholstery. If the seat member comprises a plastics component, it may be, for example, configured in a resilient manner, whereby the seat member per se comprises a specific seat hardness and upholstery or a non-resilient plastics component, whereby a reduction of the seat hardness can be obtained exclusively by the first carrier portion.

Finally, embodiments of the seat apparatus are contemplated in which the seat member and the carrier unit form a common integral component, in particular a multi-component injection-molded part.

If, for example, the seat member comprises a plastics part, the seat apparatus, in particular the seat member and carrier unit, may form a common, integral component.

Additional features, details and advantages of the invention will be appreciated from the appended patent claims, the graphic illustration and following description of a preferred embodiment of the seat apparatus.

BRIEF DESCRIPTION OF THE DRAWING

FIG. 1 is a side view of an exemplary embodiment of the seat apparatus.

DETAILED DESCRIPTION OF THE DRAWING

FIG. 1 shows a seat apparatus which is generally designated 2 for a tilting vehicle (not explicitly shown in the Figures). The seat apparatus 2 comprises a seat member (body) 4 which has a seat face (surface) 6. A user of the tilting vehicle can be arranged on the seat face 6. As a result of the inherent weight of the seat member 4 and as a result of the, where applicable, additional weight of one or more users of the tilting vehicle, the seat member 4 can be acted on with a force which acts in an active direction 8.

Furthermore, the seat apparatus 2 comprises a carrier (support) unit 10 which comprises at least one resiliently bendable and/or deformable first carrier portion 12, on which the seat member 4 is arranged. Furthermore, the carrier unit 10 comprises a substantially rigid, non-flexible, second carrier portion 14. A hollow space (cavity) 16, by which the first carrier portion 12 and the second carrier portion 14 are spaced apart from each other, extends between the first carrier portion 12 and the second carrier portion 14.

The seat apparatus 2 further comprises an adjustment unit 18 which comprises two adjustment members 20 in the exemplary embodiment shown in the figure. The adjustment members 20 are movably arranged in the hollow space 16. Both the first carrier portion 12 and the second carrier portion 14 are supported on the adjustment members 20. The two adjustment members 20 can be moved from a first support position, in which the first carrier portion 12 comprises a first spring rate, into a second support position, in which the first carrier portion 12 comprises a second spring rate which differs from the first spring rate. In the exemplary embodiment shown in FIG. 1, the two adjustment members 20 can be arranged independently of each other.

FIG. 1 shows an exemplary embodiment of the seat apparatus 2, in which the adjustment members 20 can be moved by a translational movement in a movement direction 22, which extends transversely relative to the active direction 8, from the first support position into the second support position.

The hollow space 16 of the exemplary embodiment shown in FIG. 1 is in the form of a continuous recess which is accessible from the outer side from an access direction 24 which extends transversely relative to the active direction 8 and transversely to the movement direction 22.

In the exemplary embodiment shown in FIG. 1, the carrier unit 10 is in the form of an integral component, in particular a multi-component injection-molded part. The first carrier portion 12 is formed in this instance by a first plastics material and the second carrier portion 14 is formed by a second plastics material.

The features of the invention as disclosed in the present description, claims and drawings may be significant both individually and in any combination in the implementation of the invention in the different embodiments thereof.

LIST OF REFERENCE NUMERAL

2 Seat apparatus
4 Seat member (body)
6 Seat face (surface)
8 Active direction
10 Carrier (support) unit
12 First carrier portion
14 Second carrier portion
16 Hollow space (cavity)
18 Adjustment unit
20 Adjustment member
22 Movement direction
24 Access direction

The invention claimed is:

1. A seat apparatus for a tilting vehicle, comprising:
a seat member having a seat face on which a user of the tilting vehicle is seatable, the seat member being acted on with a force acting in an active direction, wherein the active direction extends transversely relative to the seat face; and
at least one carrier unit, wherein the at least one carrier unit comprises:
  at least one resiliently bendable and/or deformable first carrier portion on which the seat member is arranged,
  at least one rigid, non-flexible, second carrier portion, and at least one hollow space arranged between the at least one first carrier portion and the at least one second carrier portion and extending parallel with or obliquely relative to the seat face, wherein the at least one first carrier portion and the at least one second carrier portion are spaced apart from each other without contact by the at least one hollow space and wherein an elastic deformation of the at least one first carrier portion toward the at least one hollow space is enabled by the at least one hollow space; and
at least one adjustment unit comprising at least one adjustment member which is movably arranged in the at least one hollow space and by which the at least one first carrier portion is supported on the at least one second carrier portion, and which adjustment member is changeable from a first support position, in which the at least one first carrier portion comprises a first spring rate, into a second support position, in which the at least one first carrier portion comprises a second spring rate differing from the first spring rate.

2. The seat apparatus according to claim 1, wherein the at least one adjustment member is movable manually or automatically from the first support position into the second support position, and vice versa.

3. The seat apparatus according to claim 1, wherein a first adjustment member is movable by a translational movement in a movement direction, which extends transversely or obliquely relative to the active direction, from the first support position into the second support position, and/or
a second adjustment member is movable by rotation about a rotation axis which extends centrally or eccentrically through the second adjustment member from the first support position into the second support position.

4. The seat apparatus according to claim 1, wherein the at least one hollow space comprises a continuous recess which is accessible from an outer side in an access direction which extends transversely relative to the active direction and transversely relative to a movement direction of the at least one adjustment member.

5. The seat apparatus according to claim 1, wherein the at least one adjustment member is configured to be resiliently deformable or rigid at least in the active direction of the force.

6. The seat apparatus according to claim 1, wherein the at least one adjustment member abuts the at least one first carrier portion and/or the at least one second carrier portion in a linear or planar manner.

7. The seat apparatus according to claim 1, further comprising:
at least two adjustment members, in a state coupled together, are movable from the first support position, into the second support position, and/or
at least two adjustment members are movable individually and independently of each other from the first support position into the second support position.

8. The seat apparatus according to claim 1, wherein the at least one first carrier portion and the at least one second carrier portion form a common integral component.

9. The seat apparatus according to claim 8, wherein the at least one carrier unit comprises a two-component injection-molded part.

10. The seat apparatus according to claim 1, wherein the seat member comprises an upholstery member or a plastics component.

11. The seat apparatus according to claim 1, wherein the seat member and the at least one carrier unit form a common integral component.

12. The seat apparatus according to claim 11, wherein the seat member and the at least one carrier unit form a multi-component injection-molded part.

* * * * *